Nov. 23, 1943.  D. B. CLARK ET AL  2,334,906
METHOD AND MEANS FOR RATING THE LIGHT SPEED OF LENSES
Filed Sept. 14, 1940

INVENTORS.
Daniel B. Clark
Grover Laube
BY
ATTORNEY

Patented Nov. 23, 1943

2,334,906

UNITED STATES PATENT OFFICE 2,334,906

METHOD AND MEANS FOR RATING THE LIGHT SPEED OF LENSES

Daniel Bryan Clark and Grover Laube, Los Angeles, Calif., assignors to Twentieth Century-Fox Film Corporation, Los Angeles, Calif., a corporation of New York Application September 14, 1940, Serial No. 356,822

6 Claims. (Cl. 88—14)

This invention relates to a method and a means for measuring the light speed of lenses.

The present method of rating the speed of lenses is based upon the mathematical ratio of the diameter of the diaphragm opening, to the focal length of the lens. This system is applied to all types of lenses and is known as the f/ system. It is evident that a system of this nature which involves only the aperture and the focal length of the lens fails to take into account the physical makeup of the lens involving the number of elements, the arrangement of the elements, the transmission properties of the elements, and the loss of light by reflection and absorption. For this reason two lenses rated as having the same speed under the f/ system will not transmit the same amount of effective light under equivalent lighting conditions. Furthermore, due to a vignetting effect on the light transmission over the aperture which progressively increases as the aperture is opened, the mathematical ratio or the f/ rating does not represent a true value of the light transmitted through the lens at different light stops. It is a demonstrable fact that lenses calibrated for speed under the f/ system in some cases do not transmit even an approximate amount of light commensurate with the light indicated by the light stops on the lens. As a matter of fact, there is an aggravated light condition in the higher speed ratings caused by the failure of the mathematical ratio to take into account the various physical losses of the lens. In the motion picture art where lenses of various focal lengths and different makes are continually interchanged in making "shots" and where the cameraman must obtain the same negative density in all his shots from day to day, it is imperative that he have an accurate rating as to the speed of all the lenses he uses, and it is even more important that the speed rating shall cover all types of lenses and shall represent the true value of effective light transmitted through each lens, without any regard to physical characteristics of the lens. In order to overcome these discrepancies and to provide a method whereby all types of lenses, whether simple or compound, or composed of glass having various light properties, may be measured and calibrated as to speed without reference to the mathematical ratio above mentioned, we conceived the idea of determining the light value transmitted through a chosen lens with a fixed aperture under fixed lighting conditions and using this value as a reference standard for all types of lenses and for all light apertures used in connection with the lenses. Under these conditions it becomes immaterial what the lens construction is, or the number of elements involved, since all these factors are compensated for in the actual amount of effective light transmitted. In addition, a method for calibrating the speed of lenses based upon the effective light transmitted is closely allied with the modern method of gauging set lighting by a photometer where the actual value of reflected light is measured and referred directly to light stops on the lens. Accordingly, it becomes the primary object of this invention to provide a method for rating the light speed of lenses upon the actual amount of effective light transmitted through the lenses.

Another object is to establish a reference base for a method of the above nature whereby all light stops for all types of lenses may be correlated and calibrated so that corresponding speed ratings on different lenses will represent the same amount of effective light transmitted.

This invention also includes a means for practicing the above method. One of the objects is to provide small apparatus that may be used in limited space, such as laboratories, small testing rooms, etc. Another object is to provide an apparatus of the above character having a comparatively small illuminated screen, thereby providing an area wherein uniform light distribution may be more easily controlled. The screen or the glass may be of extremely small area; for example, twelve inches in diameter, and the lenses may be positioned within a foot or two of the light source, the only limitation being that the covering angle of the lens does not exceed the field. In practice, the means comprises a source of light of fixed intensity diffused over a screen or a diffusion glass. In conjunction with this source of light, we use a lens mount so positioned with respect to the light that the field of the lens will subtend a uniformly lighted portion of the screen. The lens is set so that it will come to focus upon a focal plane screen within the mount when the field focus is set at infinity. Closely adjacent this screen within the mount is a light responsive element which is connected to an ultra-sensitive electric meter. The purpose of setting the lenses on infinity is to put all measurements of the light transmission capacity of each lens upon the maximum field of the lens. Accordingly, it becomes another object of this invention to provide a small, compact means for measuring the light transmission value of lenses wherein the actual effective light transmitted through the lens from a fixed source may be measured and calibrated for various light apertures while the lens is focused on infinity.

In measuring the value of the light transmitted through a lens, the size of the screen receiving the light passing through the lens may become important for integrating purposes. Our invention provides a means for utilizing various size focal plane screens.

Other objects and advantages will become apparent as the description proceeds in conjunction with the drawing, in which.

Figure 1:
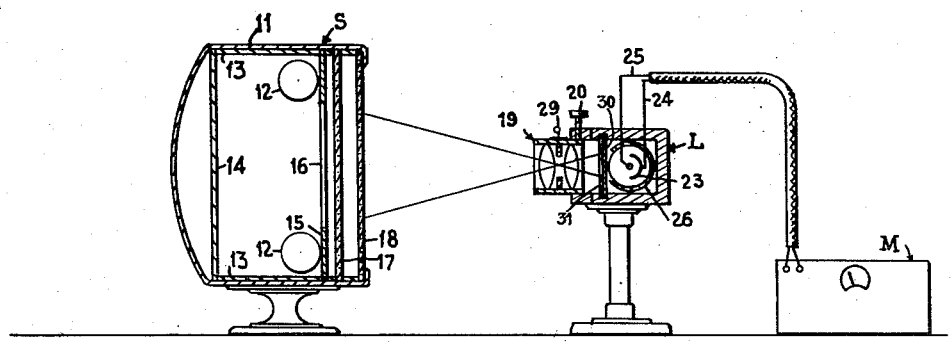
Figure 1 is a schematic illustration showing how our method may be practiced.

In Figure 1 we have shown a diagrammatic arrangement of parts for practicing our invention, which in general comprises a source of light S, a lens mount L, and an ultra-sensitive electric meter M. In practicing our invention it is essential that the source of light comprises a small field wherein the uniformity of the intensity and the distribution of the light over the field may be more accurately controlled. For this purpose we use a source of light consisting of a casing 11 and install in this casing a plurality of lights 12. The interior of the casing is lined with a light reflecting material 13 and carries a reflecting surface 14 at the rear. In order to prevent direct rays from entering the lens, we place a mask 15 in front of the lights so as to intercept the direct rays but to allow reflected rays to pass through an aperture 16 in the mask. The size of the aperture 16 will depend upon the intensity of the light source and the size of the field to be covered by the lenses. As a further means for obtaining uniform distribution of light over the field, we employ diffusion glasses, in this instance two, designated 17 and 18. In practice it has been found that these two glasses, in conjunction with the reflection internally of the casing 11 and the mask 15, will provide a uniform distribution of the light over a prescribed portion of the glass 18. In calibrating the light speed rating of a lens, the lens, which is diagrammatically illustrated and designated 19 in Figure 1, is mounted in the mount L. It is to be understood that this same mount may be used for all types of lenses of different makes and of different focal lengths and that it is immaterial what distance the lens mount is placed from the source of light, the only requirement being that the field subtended by the lens falls within the uniformly lighted portion which is determined by the aperture 16. A thumb screw 20 is incorporated in the mount for holding the lens in a fixed position after it is set.

Figure 2:
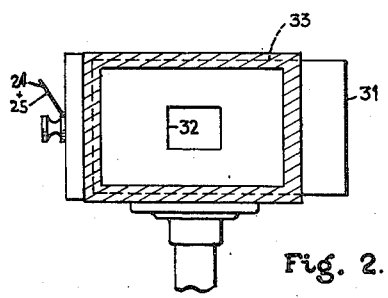
Figure 2 is a cross section of the lens mount showing the manner in which various apertures may be installed.
Figure 4:
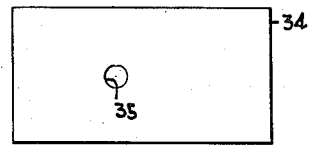
Figure 4 is an illustration showing another type of aperture that may be used.
Figure 3:
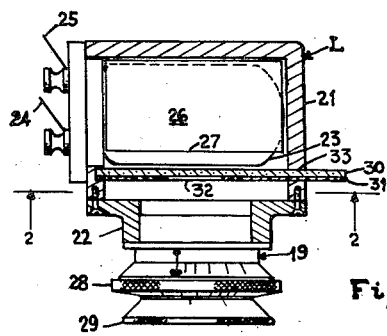
Figure 3 is a horizontal section of the mount showing the component parts thereof.

For describing the actual calibrating of a lens, reference is had to Figures 2 and 3, wherein a more detailed illustration of the parts will be found. Here it will be seen that the lens mount L comprises a casing 21 having means thereon such as 22 for mounting the lens 19. Internally of the casing we mount a photo-responsive member 23 and connect this member by means of conductors 24 and 25 to the meter M. As a means of increasing the sensitivity of the member 23, we provide a reflector shield 26 around the tube and leave a window 27 to admit light to the sensitive elements in the tube. The lens 19 is mounted in the usual manner in the fitting 22 for that purpose and comprises the usual focusing ring 28 and the diaphragm control 29. As stated before, the lens is set to focus upon infinity and in practice all lenses to be calibrated under this arrangement should be focused on infinity to make all speed ratings of different lenses upon the maximum field of each lens. Between the lens 19 and the photo-responsive member 23, we insert a diffusion glass 30 and over this diffusion glass we place a mask 31 having an aperture 32 therein. It is to be understood that the lens 19 is positioned in the mount so that the focal plane image will fall upon the diffusion glass 30 and that the purpose of the mask 31 is to define the extent of this image upon the glass. For calibrating lenses for motion picture work we recommend that the aperture 32 be substantially the same size as a motion picture film aperture, since this will yield a true reading of the value of light transmitted to a motion picture frame in actually photographing a scene. It will be noted that the glass 30 and the mask 31 are slidably mounted in a slot 33 in the casing 21 so that other masks such as 34 having an aperture 35 therein may be inserted in place of the mask 31. A series of masks such as 34 having various sizes of apertures therein may be used for integrating the light over a field for accurately determining the distribution of the light over the field.

In calibrating lenses we first establish a reference standard by measuring the light from a fixed uniformly distributed source transmitted through a 35 mm. lens focused upon infinity and set at f/3.2. The reading on the meter M for this setup is used as a standard reference for all other readings on all other types of lenses with the same setup. The lens to be calibrated is substituted for the master lens 19 in the mount L and its diaphragm control ring is manipulated until the meter M shows the same reading as for the set-up with the master lens. The position of the control ring is then indicated and marked as f/3.2. This brings the lens to the standard reference point established by the master lens. From this reference point the light stops are calibrated on the lens by meter readings and without any referene to mathematical ratio or physical characteristics of the lens the diaphragm control ring 29 is turned until the meter reading shows a full step in light transmission, whereupon the lens is calibrated at this point corresponding to the stop indicated by the current shown on the meter. The process may be carried on and the light stops may be indicated on the lens until the full capacity of the diaphragm control has been reached. When a lens has been calibrated in this manner it will actually transmit effective light over a fixed aperture commensurate with the light stop calibration on the lens. Moreover, when different lenses are calibrated under this method and referred to the same reference base they will all transmit the same amount of light for all corresponding light stops indicated. Under these conditions a cameraman using first a 35 mm. lens set at f/3.2 and subsequently a 75 mm. lens set at f/3.2 will know that he is getting exactly the same light value through each lens. Furthermore, under our method, if a cameraman found it necessary to change the light stop from f/3.2 on either a 35 mm. or a 75 mm. lens to, say, f/4.5, he would know that he was getting exactly one-half the light value through each lens and, of equal importance, he would know that the lenses were transmitting the same amount of light in each case. A system of lenses calibrated under the foregoing method will provide a much needed improvement in the art of photography.

We claim:

1. A method for rating lenses with respect to light speed consisting in measuring the light transmitted from a fixed light source through a given lens having a variable diaphragm with the diaphragm control set at a predetermined position, establishing equivalent positions of diaphragm controls on other lenses by varying the positions of said diaphragm controls to make the value of light transmitted through said other lenses from an equivalent light source substantially equal to said first mentioned light value and indicating the positions of said diaphragm controls on their respective lenses.

2. A method for rating the light speed of a lens having an adjustable diaphragm consisting in measuring the value of light transmitted through said lens from a fixed light source and determining a given light stop on said lens by manipulating the diaphragm until the light transmitted through the lens is substantially equal to the value of light transmitted through a predetermined stop on a reference lens from an equivalent light source, indicating the position of the diaphragm on said first mentioned lens and designating said position the same as the predetermined stop on said second mentioned lens.

3. A method for rating the light speed of lenses having adjustable diaphragms associated therewith consisting in establishing a reference base for lens light speed by measuring the value of light transmitted through a predetermined light stop associated with a given lens from a fixed source of light and utilizing the said measured value of transmitted light as a means of calibrating the light speed of other lenses having aperture controls associated therewith by manipulating the aperture controls of said other lenses until the amount of light transmitted therethrough from an equivalent light source is substantially equal to the above mentioned measured value of transmitted light, indicating the positions of the aperture controls on said other lenses and designating said positions the same as said predetermined light stop on said given lens.

4. A method for correlating the light speed ratings of a plurality of lenses consisting in establishing a reference light level for all lenses by measuring the light transmitted from a fixed light source through a master lens having a predetermined light stop associated therewith, causing each of said plurality of lenses to transmit substantially the same amount of light from an equivalent light source by manipulating the diaphragm control of each of said lenses, indicating the positions of said controls on their respective lenses and designating said positions the same as the predetermined light stop on said master lens.

5. A method for rating lenses with respect to light speed consisting in measuring the light transmitted through a predetermined light stop and a given lens from a fixed light source, determining light stops on other lenses by adjusting the diaphragm controls thereof to cause the measured light value transmitted through said other lenses from an equivalent light source to be equivalent to said first measured light value and marking the positions of said diaphragm controls on their respective lenses.

6. A method for rating lenses with respect to light speed consisting in measuring the light transmitted through a predetermined light stop and a given lens from a fixed light source, establishing a like light stop on another lens by producing an equivalent measured light value passing through said other lens and a light aperture having a manual control therewith associated with said other lens by varying said aperture to vary the value of light passing therethrough from an equivalent light source and marking the position of said manual control on said other lens.

DANIEL BRYAN CLARK.
GROVER LAUBE.